US00RE49568E

(19) United States
(12) Reissued Patent
Nahavandi et al.

(10) Patent Number: US RE49,568 E
(45) Date of Reissued Patent: Jul. 4, 2023

(54) DISPLAY SCREEN OR PORTION THEREOF WITH ICON

(71) Applicant: Stryker Corporation, Kalamazoo, MI (US)

(72) Inventors: Kurosh Nahavandi, Portage, MI (US); Benjamin John Purrenhage, Kalamazoo, MI (US); Donald Scott Herzog, Kalamazoo, MI (US); Ian Christopher Geiman, South Lyon, MI (US); Jeffrey Alan Kennedy, Kalamazoo, MI (US)

(73) Assignee: Stryker Corporation, Kalamazoo, MI (US)

(21) Appl. No.: 29/847,678

(22) Filed: Jul. 27, 2022

Related U.S. Patent Documents

Reissue of:
(64) Patent No.: Des. 891,463
Issued: Jul. 28, 2020
Appl. No.: 29/719,242
Filed: Jan. 2, 2020

U.S. Applications:
(62) Division of application No. 29/661,190, filed on Aug. 24, 2018, now Pat. No. Des. 886,126.

(51) LOC (14) Cl. ..... 14-04
(52) U.S. Cl.
USPC ..... D14/489
(58) Field of Classification Search
USPC ..... D14/485–495; D12/319, 434; D21/447
(Continued)

(56) References Cited

U.S. PATENT DOCUMENTS

D679,726 S * 4/2013 Kobayashi ..... D14/489
D684,182 S * 6/2013 Phelan ..... D14/489
(Continued)

OTHER PUBLICATIONS

Internet Search entitled "Signs on US Highway" dated Aug. 24, 2018; URL: https://www.google.com/search?q=signs+on+US+highway&rlz=1C1GGRV_enUS748US749&tbm=isch&tbo=u&source=univ&sa=X&ved=2ahUKEwibsuGlooPdAhXH5IMKHScwCIUQ7AI6BAgFEA8&biw=1707&bih=809&dpr=1.13#imgrc=RLzfRspYH0JP4M.
(Continued)

*Primary Examiner* — Darlington Ly
(74) *Attorney, Agent, or Firm* — McDonnell Boehnen Hulbert & Berghoff LLP

(57) CLAIM

The ornamental design for a display screen or portion thereof with [animated] icon, as shown and described.

DESCRIPTION

This [disclosure] *is an application for reissue of U.S. Pat. No. D. 891,463, which issued on Jul. 27, 2020, which* is a divisional of U.S. patent application Ser. No. 29/661,190 filed Aug. 24, 2018, *the contents of both of* which [is] *are* hereby incorporated by reference herein in [its] *their* entirety.

Figure 1:
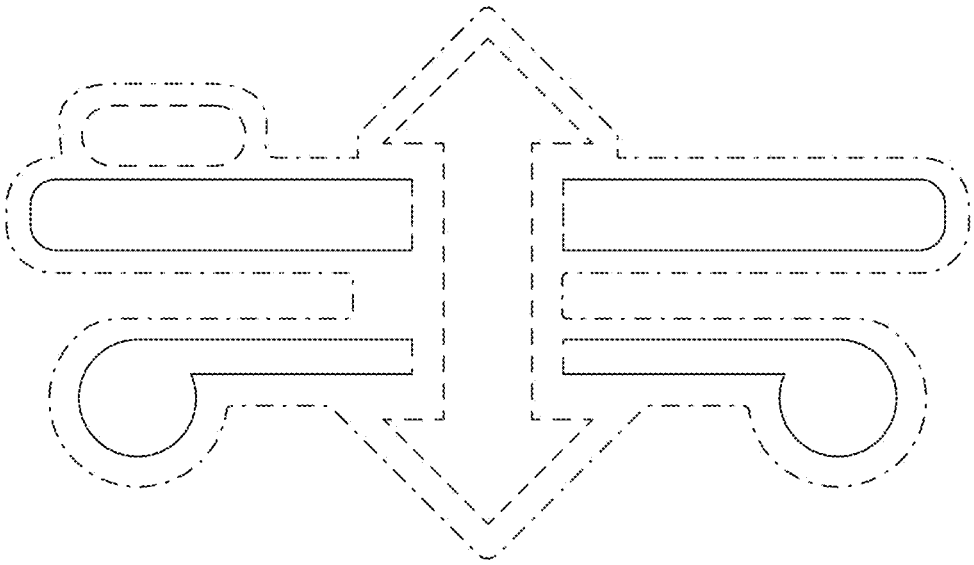
FIG. 1 is [the first image in a sequence for] *a front view of a first embodiment of* a display screen with [animated] an icon [showing my/our new] of the present design[.]*; and*
Figure 2:
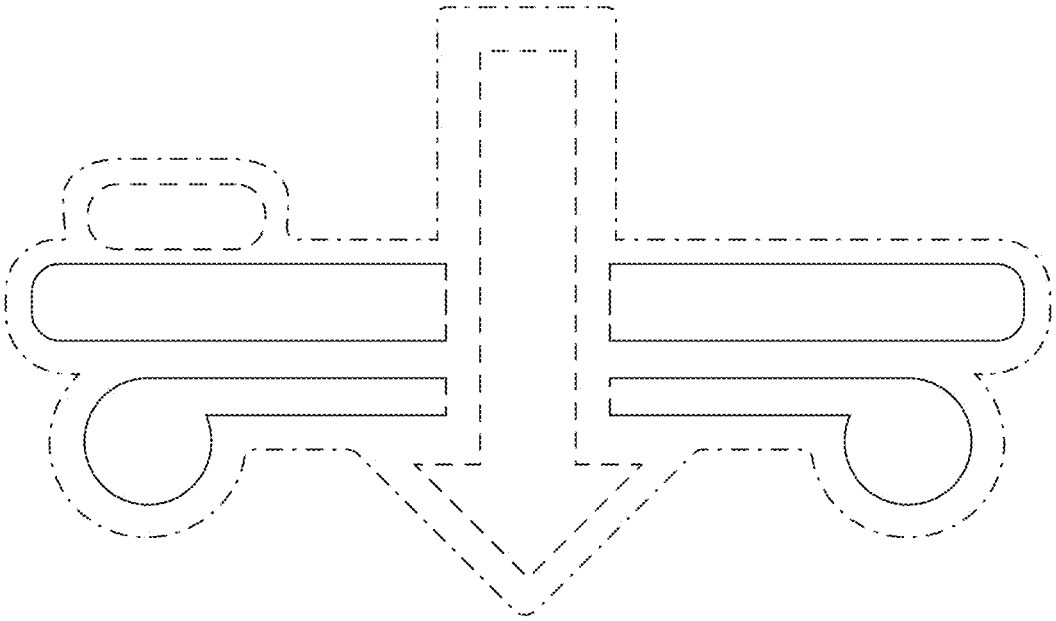
FIG. 2 is [the second image thereof] *a front view of a second embodiment of a display screen with an icon of the present design.*

[The appearance of the animated icon transitions sequentially between the images shown in FIGS. 1-2. The process or period in which one image transitions to another forms no part of the claimed design. The presently claimed design includes the sequence as shown, as well as any sequence that includes fewer than, or a different order of, the sequential transition of the images as shown.] The broken [line showings of a portion of the display screen are for environmental
(Continued)

AMENDED purposes only and to ] *lines in the figures show a display screen or portion thereof and* form no part of the claimed design.

1 Claim, 2 Drawing Sheets

Matter enclosed in heavy brackets [ ] appears in the original patent but forms no part of this reissue; matter printed in italics indicates the additions made by reissue.

(58) Field of Classification Search
CPC .... G06F 3/048; G06F 3/0481; G06F 3/04812; G06F 3/04817; G06F 3/0482; G06F 3/0484; G06F 3/0485; G06F 3/0487; G06F 3/0488; G06F 3/04883; G06F 3/04886; G06F 3/0489; H04L 12/581; H04L 12/1813; H04L 51/32
See application file for complete search history.

(56) References Cited

U.S. PATENT DOCUMENTS

| | | | | | |
|---|---|---|---|---|---|
| D695,307 | S | * | 12/2013 | Wu | D14/491 |
| D695,310 | S | * | 12/2013 | Jang | D14/491 |
| D697,531 | S | * | 1/2014 | Phelan | D14/489 |
| D706,824 | S | | 6/2014 | Smith | D14/489 |
| D710,896 | S | | 8/2014 | Hollobaugh | D14/490 |
| D725,145 | S | * | 3/2015 | Johnson | D14/491 |
| D730,402 | S | * | 5/2015 | Kang | D14/491 |
| D738,913 | S | * | 9/2015 | Cabrera-Cordon | D14/491 |
| D738,914 | S | * | 9/2015 | Torres | D14/491 |
| D761,315 | S | * | 7/2016 | Kim | D14/492 |
| D761,859 | S | | 7/2016 | Kim | D14/492 |
| D761,860 | S | | 7/2016 | Kim | D14/492 |
| D763,316 | S | | 8/2016 | Kim | D14/492 |
| D767,597 | S | * | 9/2016 | Shin | D14/485 |
| D767,624 | S | * | 9/2016 | Lee | D14/488 |
| D767,626 | S | * | 9/2016 | Lee | D14/489 |
| D767,627 | S | * | 9/2016 | Lee | D14/489 |
| D768,147 | S | * | 10/2016 | Yoo | D14/485 |
| D768,713 | S | * | 10/2016 | Lee | D14/489 |
| D769,322 | S | * | 10/2016 | Rajeswaran | D14/491 |
| D769,936 | S | | 10/2016 | Seo | D14/489 |
| D772,293 | S | * | 11/2016 | Lee | D14/492 |
| D774,521 | S | | 12/2016 | Agee | D14/485 |
| D774,524 | S | * | 12/2016 | Agee | D14/485 |
| D775,204 | S | * | 12/2016 | Cho | D14/492 |
| D778,317 | S | * | 2/2017 | Lee | D14/492 |
| D779,541 | S | * | 2/2017 | Cole | D14/486 |
| D780,805 | S | * | 3/2017 | van Os | D14/491 |
| D787,554 | S | * | 5/2017 | Kim | D14/491 |
| D788,169 | S | * | 5/2017 | Wessel | D14/492 |
| D788,170 | S | | 5/2017 | Wessel | D14/495 |
| D789,411 | S | * | 6/2017 | Miao | D14/491 |
| D791,185 | S | | 7/2017 | Kim | D14/492 |
| D792,457 | S | * | 7/2017 | Huh | D14/489 |
| D792,459 | S | * | 7/2017 | Lee | D14/491 |
| D793,430 | S | * | 8/2017 | Huh | D14/489 |
| D793,436 | S | * | 8/2017 | Mustonen | D14/491 |
| D794,074 | S | | 8/2017 | Torres | D14/494 |
| D797,799 | S | * | 9/2017 | Bunyard | D14/491 |
| D800,169 | S | * | 10/2017 | Park | D14/488 |
| D800,773 | S | * | 10/2017 | Kim | D14/488 |
| D802,623 | S | * | 11/2017 | Arnold | D14/489 |
| D803,872 | S | * | 11/2017 | Cole | D14/491 |
| D803,880 | S | * | 11/2017 | Hohne | D14/491 |
| D809,532 | S | | 2/2018 | Kato | D14/485 |
| D809,541 | S | * | 2/2018 | Makowski | D14/492 |
| D810,109 | S | * | 2/2018 | Makowski | D14/492 |
| D812,073 | S | * | 3/2018 | Lehmann | D14/485 |
| D812,080 | S | * | 3/2018 | Saneii | D14/486 |
| D812,630 | S | * | 3/2018 | Yuguchi | D14/486 |
| D813,882 | S | * | 3/2018 | Shivaji-Rao | D14/485 |
| D816,107 | S | * | 4/2018 | Kim | D14/487 |
| D819,690 | S | * | 6/2018 | Choi | D14/491 |
| D819,694 | S | * | 6/2018 | Kim | D14/492 |
| D823,340 | S | * | 7/2018 | Seo | D14/491 |
| D824,932 | S | * | 8/2018 | Joensson | D14/485 |
| D824,952 | S | * | 8/2018 | Yuguchi | D14/486 |
| D824,957 | S | * | 8/2018 | Seo | D14/491 |
| D826,254 | S | * | 8/2018 | Yuguchi | D14/487 |
| D826,974 | S | * | 8/2018 | Perez-Bravo | D14/486 |
| D826,983 | S | * | 8/2018 | Hamaguchi | D14/491 |
| D828,365 | S | * | 9/2018 | Elseaidy | D14/485 |
| D829,287 | S | | 9/2018 | Kessler et al. | D21/714 |
| D831,699 | S | * | 10/2018 | Jewitt | D14/492 |
| D832,286 | S | * | 10/2018 | Ilyasov | D14/492 |
| D832,862 | S | * | 11/2018 | Crone | D14/492 |
| D834,591 | S | * | 11/2018 | Lehmann | D14/485 |
| D834,593 | S | * | 11/2018 | Lehmann | D14/485 |
| D837,232 | S | * | 1/2019 | Mariet | D14/491 |
| D839,287 | S | * | 1/2019 | Hersh | D14/486 |
| D839,904 | S | * | 2/2019 | Yun | D14/486 |
| D840,418 | S | * | 2/2019 | Saad Ahmed | D14/485 |
| D856,354 | S | * | 8/2019 | Yun | D14/486 |
| D857,749 | S | * | 8/2019 | Brinker | D14/491 |
| D860,248 | S | * | 9/2019 | Brooks | D14/488 |
| D876,481 | S | * | 2/2020 | Nahavandi | D14/489 |
| D876,482 | S | * | 2/2020 | Kennedy | D14/489 |
| 2016/0199240 | A1 | | 7/2016 | Newkirk et al. | G05B 15/02 715/771 |
| 2017/0027789 | A1 | | 2/2017 | St John et al. | A61G 7/0524 |

OTHER PUBLICATIONS

Stryker S3 MedSurg Bed Product Information dated Aug. 24, 2018; URL: https://www.stryker.com/us/en/acute-care/products/s3.html.
Stryker In Touch, Critical Bed Care Product Information dated Aug. 23, 2018; URL: https://patientcare.stryker.com/en/products/beds/critical-care-beds/intouch#.
U.S. Appl. No. 62/525,353.
U.S. Appl. No. 62/525,359.

* cited by examiner

AMENDED

AMENDED